United States Patent
Kangude et al.

(10) Patent No.: US 7,962,139 B2
(45) Date of Patent: Jun. 14, 2011

(54) REDUCTION OF HANDOVER LATENCIES IN A WIRELESS COMMUNICATION SYSTEM

(75) Inventors: Shantanu Kangude, Dallas, TX (US); Pierre Bertrand, Antibes (FR); Ariton E. Xhafa, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 976 days.

(21) Appl. No.: 11/765,995

(22) Filed: Jun. 20, 2007

(65) Prior Publication Data

US 2007/0293225 A1 Dec. 20, 2007

Related U.S. Application Data

(60) Provisional application No. 60/805,261, filed on Jun. 20, 2006, provisional application No. 60/805,306, filed on Jun. 20, 2006, provisional application No. 60/805,429, filed on Jun. 21, 2006.

(51) Int. Cl.
*H04Q 1/00* (2006.01)
(52) U.S. Cl. .......................... 455/436; 455/439; 455/442
(58) Field of Classification Search .................. 455/436, 455/432.1, 432.2, 434, 435.1, 435.2, 435.3, 455/437, 438, 439, 442; 370/329, 331
See application file for complete search history.

(56) References Cited

U.S. PATENT DOCUMENTS

| | | | |
|---|---|---|---|
| 2005/0243761 A1* | 11/2005 | Terry et al. | 370/328 |
| 2005/0272426 A1* | 12/2005 | Yang et al. | 455/436 |
| 2007/0032255 A1* | 2/2007 | Koo et al. | 455/512 |
| 2007/0047493 A1* | 3/2007 | Park et al. | 370/331 |
| 2007/0149206 A1* | 6/2007 | Wang et al. | 455/450 |
| 2007/0171871 A1* | 7/2007 | Forsberg | 370/331 |
| 2007/0184865 A1* | 8/2007 | Phan et al. | 455/509 |

* cited by examiner

*Primary Examiner* — Jean A Gelin
(74) *Attorney, Agent, or Firm* — Ronald O. Neerings; Wade James Brady, III; Frederick J. Telecky, Jr.

(57) ABSTRACT

Systems and methods for reduction of handover latencies in wireless communication systems are described herein. Some illustrative embodiments include a wireless mobile communication device that includes a wireless transceiver including a transmitter configured to transmit a first signal synchronized for reception by a first cellular node, and processing logic that couples to the wireless transceiver. Before the wireless transceiver receives a handover command the processing logic causes the transmitter to transmit a second signal for reception by a second cellular node to request allocation of an upload resource for communication with the second cellular node as part of an impending handover.

24 Claims, 6 Drawing Sheets

REDUCTION OF HANDOVER LATENCIES IN A WIRELESS COMMUNICATION SYSTEM

CROSS-REFERENCE TO RELATED APPLICATIONS

The present application claims the benefits of provisional application Ser. No. 60/805,261, filed Jun. 20, 2006 and entitled "Reducing Handover Latencies Using Early RACH Access in 3GPP LTE," provisional application Ser. No. 60/805,306, filed Jun. 20, 2006 and entitled "Reducing Handover Latencies Using Early RACH Access in 3GPP LTE," and provisional application Ser. No. 60/805,429, filed Jun. 21, 2006 and entitled "Reducing Handover Latencies Using Early RACH Access in 3GPP LTE," all of which are herein incorporated by reference.

BACKGROUND

The use of mobile communication devices has increased dramatically in recent years. These mobile devices include devices that communicate with a network of wireless transceivers or base stations, which are organized as an array of geographic service areas or "cells." An example of this type of wireless network is a cellular network used in conjunction with a mobile or cellular telephone. A cell can be defined as a limited geographic area completely surrounding the antenna of a base station that uses an omnidirectional antenna covering a full 360 degrees. A cell may also be defined as a portion of a geographic area surrounding a base station that uses multiple directional antennas that each covers less than 360 degrees (e.g., 4 antennas each covering 90 degrees or more, thus each defining a cell).

Whenever a user of a mobile device approaches a boundary between two cells (which includes some overlap between the cells), communications between the mobile device and the communication network may be transferred from one cell to another, depending on the relative strength of the cellular transmitters of each cell's base station. This transfer or "handover" involves command and data exchanges between the mobile device and each base station, as well as between the base stations. Such exchanges utilize a percentage of the bandwidth needed for general communications, and thus represent an overhead cost of operating the network. The actual handover also takes a certain amount of time to complete, introducing small delays and potentially a momentary interruption in the data exchanges between the mobile device and the network. With the increased use of mobile devices in video and high-speed data applications, and with the increased demand for base stations and networks that can support larger numbers of mobile devices, these delays or "latencies" introduced during handovers may decrease the performance of the base stations and the overall network to unacceptable levels.

SUMMARY

Systems and methods for reduction of handover latencies in wireless communication systems are described herein. Some illustrative embodiments include a wireless mobile communication device that includes a wireless transceiver including a transmitter configured to transmit a first signal synchronized for reception by a first cellular node, and processing logic that couples to the wireless transceiver. Before the wireless transceiver receives a handover command the processing logic causes the transmitter to transmit a second signal for reception by a second cellular node to request allocation of an upload resource for communication with the second cellular node as part of an impending handover.

Other illustrative embodiments include a plurality of cellular nodes that each includes a wireless transceiver including a transmitter and a receiver (configured to transmit signals to, and receive signals from, a wireless mobile communication device), and processing logic that couples to the wireless transceiver. Before the processing logic of a first cellular node of the plurality of cellular nodes causes its transmitter to transmit a handover command, the receiver of a second cellular node of the plurality of cellular nodes receives a request to allocate an upload resource as part of an impending handover.

Yet further illustrative embodiments include a method that includes a target cellular node within a wireless communication system receiving a request to allocate an upload resource as part of an impending handover; the target cellular node, in response to the request to allocate the upload resource, transmitting a message comprising synchronization and resource allocation information; and a source cellular node transmitting a handover command after the receiving by the target cellular node the request to allocate the upload resource.

BRIEF DESCRIPTION OF THE DRAWINGS

For a detailed description of illustrative embodiments of the invention, reference will now be made to the accompanying drawings in which.

NOTATION AND NOMENCLATURE

Certain terms are used throughout the following discussion and claims to refer to particular system components. This document does not intend to distinguish between components that differ in name but not function. In the following discussion and in the claims, the terms "including" and "comprising" are used in an open-ended fashion, and thus should be interpreted to mean "including but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "system" refers to a collection of two or more hardware and/or software components and may be used to refer to an electronic device, such as a mobile wireless communication device or a cellular node, a portion of a mobile wireless communication device or cellular node, mobile wireless communication devices and/or cellular nodes, etc. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1:
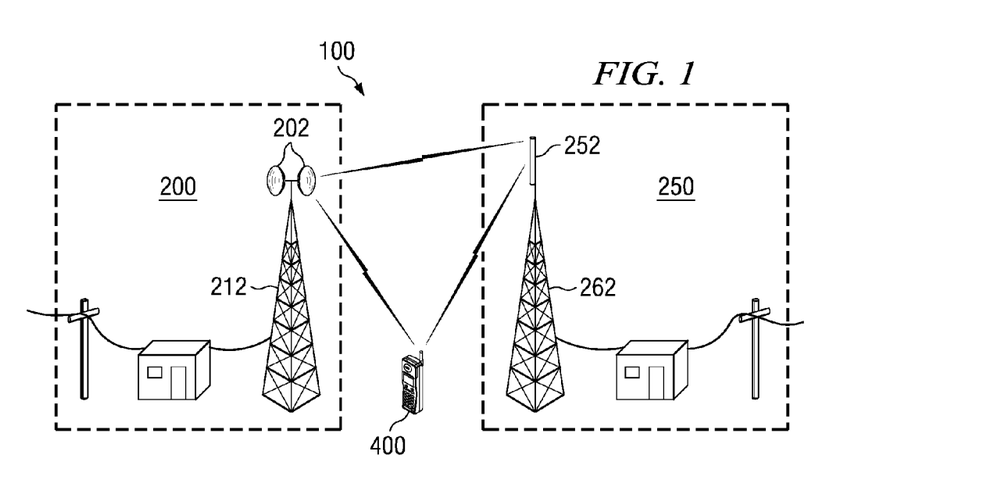
FIG. 1 shows a wireless communication system including two base stations and a mobile communication device, all constructed in accordance with at least some illustrative embodiments.

FIG. 1 shows a portion of a communications network 100 that includes base stations 200 and 250, each constructed in accordance with at least some illustrative embodiments. The base stations shown are part of a terrestrial communication network used by mobile communication device 400, also constructed in accordance with at least some illustrative embodiments, to access the communications network 100. Each base station includes one or more antennas and corresponding receivers that each defines a transmission coverage area known as a "cell." Thus, each base station may have one or more "cellular nodes," each with a transceiver and antenna that provides communications for a given cell. Wireless mobile communication device 400 communicates with a cellular node through a given antenna based upon the cell within which the wireless mobile communication device 400 is located.

Figure 2:
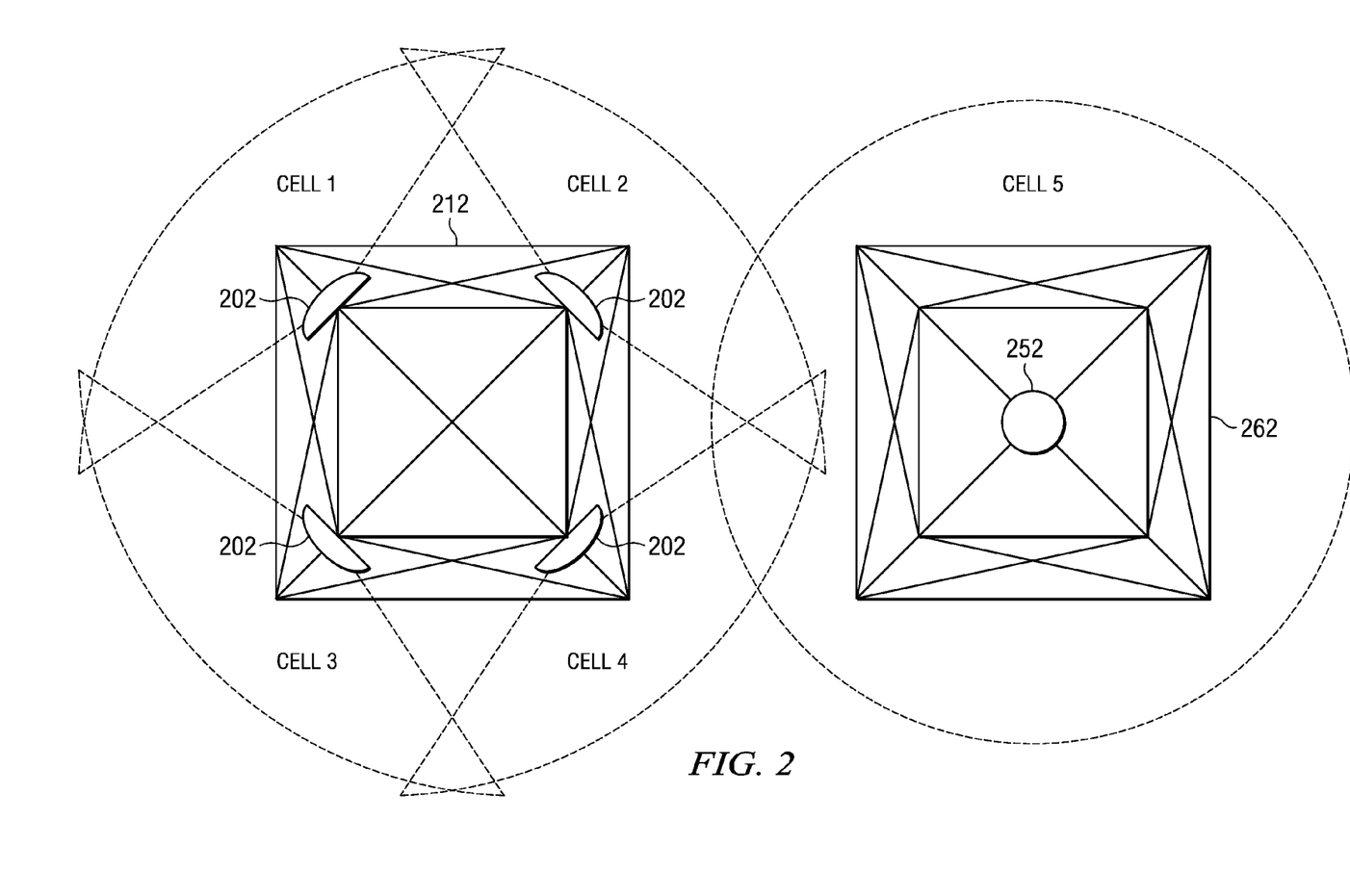
FIG. 2 shows the distribution of cells within and between base stations constructed in accordance with at least some illustrative embodiments.

FIG. 2 shows the coverage areas of the cells defined by each of the antennas shown in FIG. 1. The antennas 202 mounted on tower 212 each define a pie shaped cell emanating from each antenna (Cells 1 through 4). The antenna 252 mounted on tower 262 defines a single cell (Cell 5) covering a full 360 degrees around the tower. The cells overlap in order to allow uninterrupted communications as the wireless mobile communication device 400 is moved between the coverage areas defined by the cellular nodes. When wireless mobile communication device 400 approaches a boundary of one cell (the "source" cell) while moving towards the antenna of another cell (the "target" cell), a decision is made by processing logic controlling a transceiver coupled to the source cell antenna to transfer responsibility for communications with wireless mobile communication device 400 and execute a "handover." The handover of wireless mobile communication device 400 results in communications between the device and communications network 100 being routed through the target cell instead of the source cell. The processing system controlling a transceiver coupled to the target antenna assumes command, control and data routing functions previously performed by the processing system of the source cell.

Figure 3A:
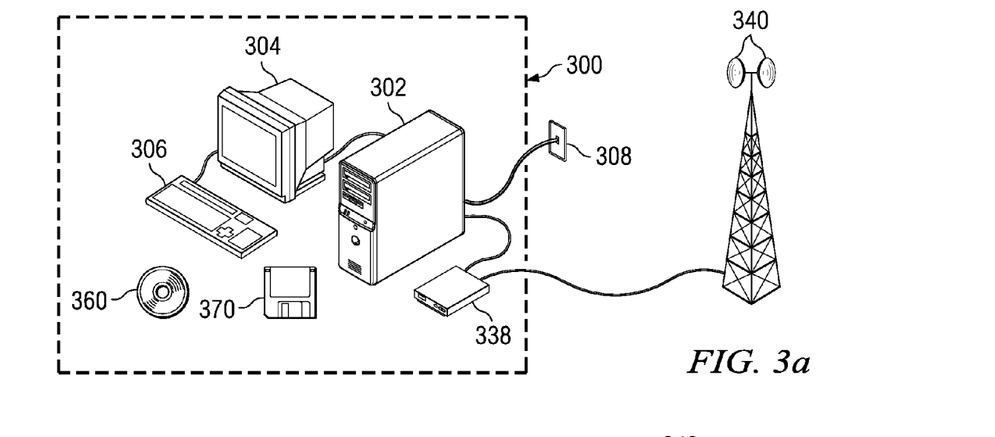
FIG. 3a shows an example of a system configuration, suitable for use as a wireless communications system cellular node, in accordance with at least some illustrative embodiments.
Figure 3B:
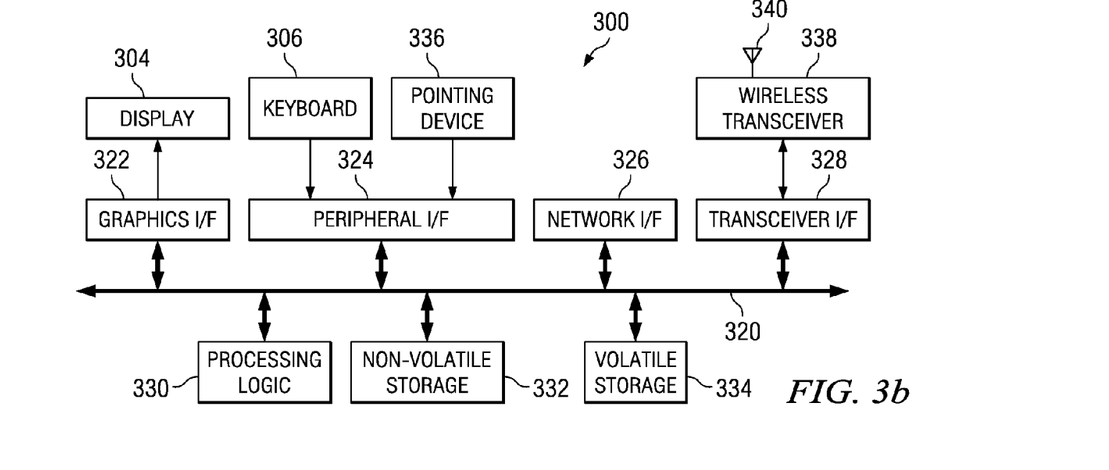
FIG. 3b shows a block diagram of the system configuration of 3a, in accordance with at least some illustrative embodiments.

FIGS. 3a and 3b show an illustrative system configuration 300 suitable for implementing a cellular node processing system within the base stations 200 and 250 of FIG. 1. As shown in FIG. 3a, the illustrative system configuration 300 includes a chassis 302, a display 304 and an input device (e.g., a keyboard) 306. The system configuration 300, as shown in FIG. 3b, further includes processing logic 330 (e.g., a microprocessor), non-volatile storage 332, and volatile storage 334. Non-volatile storage 332 includes a computer-readable medium such as a flash random access memory (flash RAM), a read-only memory (ROM), a hard disk drive, a floppy disk (e.g., floppy 370), a compact disk read-only memory (CD-ROM, e.g., CD-ROM 360), as well as combinations of some and/or all such medium. Volatile storage 334 includes a computer readable medium such as random access memory (RAM).

The computer readable media of both non-volatile storage 332 and volatile storage 334 include, for example, software that is executed by processing logic 330 and provides each cellular node with at least some of the functionality described herein. The system configuration 300 also includes a network interface (Network I/F) 326 that enables the system configuration 300 to transmit information to, and receive information from, a local area network (LAN) and/or a wide area network (WAN), represented in the example of FIG. 3a by Ethernet jack 308. A transceiver interface (Xcvr I/F) 328 provides an interface to wireless transceiver 338, which provides system configuration 300 with the capability of communicating wirelessly with one or more wireless mobile devices via at least one of antennas 340. A graphics interface (Graphics I/F) 322 couples to the display 304. A user interacts with the processing system via an input device such as keyboard 306 and/or pointing device (Pointing Dev) 336 (e.g., a mouse), which couples to a peripheral interface (Peripheral I/F) 324. The display 304, keyboard 306 and pointing device 336 together may operate as a user interface.

System configuration 300 may be a bus-based computer, with the bus 320 interconnecting the various elements shown in FIG. 3b. The peripheral interface 324 accepts signals from the keyboard 306 and other input devices such as pointing device 336, and transforms the signals into a form suitable for communication on bus 320. The graphics interface 322 may include a video card or other suitable display interface that accepts information from the bus 320 and transforms it into a form suitable for the display 304. Similarly, transceiver interface 328 accepts signals from wireless transceiver 338 and transforms them into a form suitable for communication on bus 320, and further accepts information from bus 320 and transforms it into a form suitable for wireless transceiver 338.

Although the illustrative embodiment of FIGS. 3a and 3b show transceiver 338 as a hardware element that is separate from system configuration 300, other embodiments may incorporate the hardware of transceiver 338 as part of system configuration 300. In still other illustrative embodiments, at least some of the functionality of transceiver 338 may be implemented as software executed by processing logic 330. Other combinations of hardware and software, both integral and external to system configuration 300, which implement the functionality of transceiver 338 will become apparent to those skilled in the art, and all such combinations are within the scope of the present disclosure.

Processing logic 330 gathers information from other system elements, including input data from the peripheral interface 324, wireless communication data from transceiver interface 328, and program instructions and other data from non-volatile storage 332 or volatile storage 334, or from other systems (e.g., a server used to store and distribute copies of executable code) coupled to a local area network or a wide area network via the network interface 326. Processing logic 330 executes the program instructions and processes the data accordingly. The program instructions may further configure processing logic 330 to send data to other system elements, such as information presented to the user via the graphics interface 322 and display 304, and wireless communication data transmitted via transceiver interface 328 and wireless transceiver 338. The network interface 326 enables processing logic 330 to communicate with other systems via a network. Volatile storage 334 may serve as a low-latency temporary store of information for processing logic 330, and non-volatile storage 332 may serve as a long-term (but higher latency) store of information.

Processing logic 330, and hence the system configuration 300 as a whole, operates in accordance with one or more programs stored on non-volatile storage 332 or received via network interface 326. Processing logic 330 may copy portions of the programs into volatile storage 334 for faster access, and may switch between programs or carry out additional programs in response to user actuation of the input devices. The additional programs may be retrieved or received from other locations via network interface 326. One or more of these programs executes on system configuration 300, causing the configuration to perform at least some of the functions of a cellular node as disclosed herein.

Figure 4A:
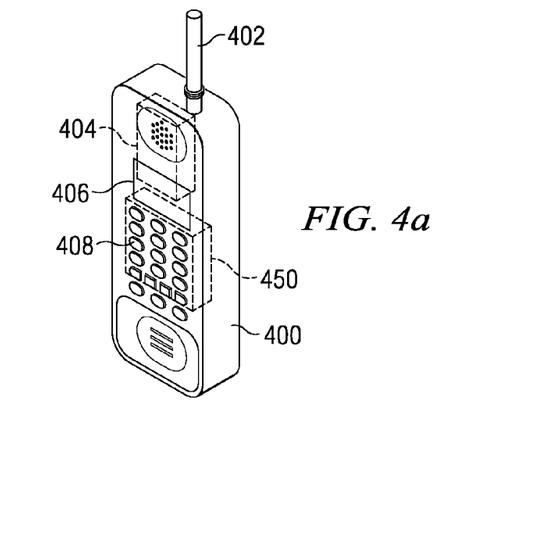
FIG. 4a shows an example of a system configuration, suitable for use as a mobile communication device, in accordance with at least some illustrative embodiments.
Figure 4B:
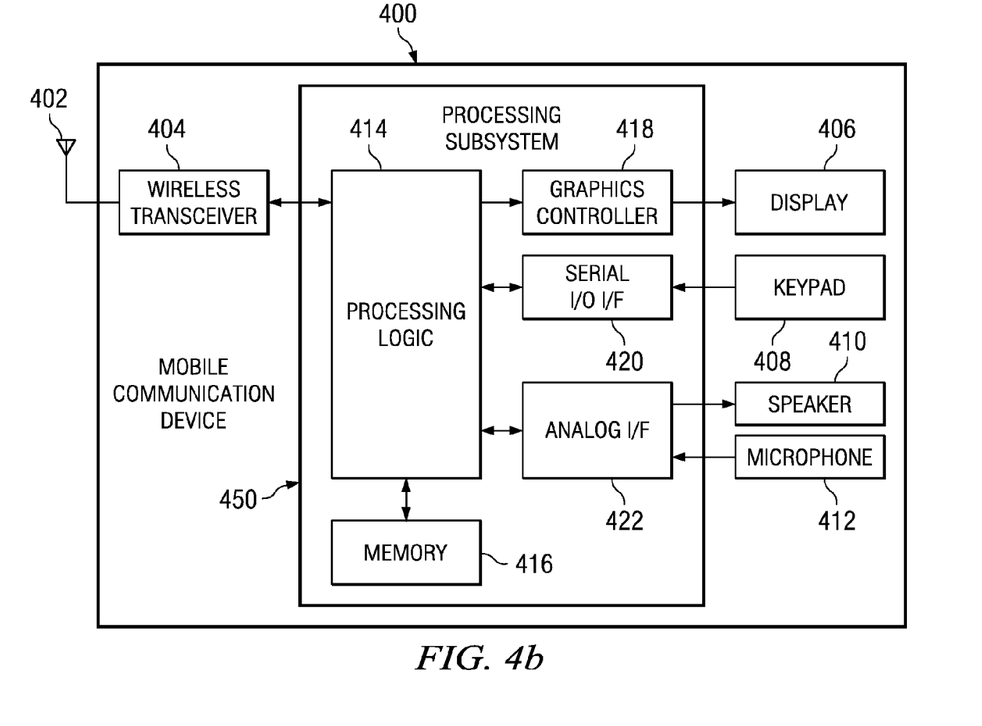
FIG. 4b shows a block diagram of the system configuration of 4a, in accordance with at least some illustrative embodiments.

FIGS. 4a and 4b show an illustrative system suitable for implementing the wireless mobile communication device 400 of FIG. 1. As shown in FIG. 4a, wireless mobile communication device 400 includes a display 406, a keypad 408, a wireless transceiver 404 with an antenna 402, and a processing subsystem 450. The processing subsystem 450, which may be implemented as a system-on-a-chip (SoC), further includes processing logic 414 (e.g., an ARM processor core), and memory 416 that may include both non-volatile and volatile storage in the form of computer-readable medium such as ROM, flash RAM and RAM.

The computer readable media of memory 416 includes, for example, software that is executed by processing logic 414 and provides the wireless mobile communication device 400 with at least some of the functionality described herein. The processing subsystem 450 also includes an analog interface (Analog I/F) 422 that sends audio to, and receives audio from, a user of the wireless mobile communication device 400, via speaker 410 and microphone (Mic) 412 respectively. Wireless transceiver 404 provides wireless mobile communication device 400 with the capability of communicating wirelessly with one or more cellular nodes via antenna 402. Processing subsystem 450 also includes a graphics controller 418 that couples to the display 406. A user interacts with the processing subsystem via an input device such as keypad 408, which couples to serial input/output interface (Serial I/O I/F) 420. The display 406 and keypad 408 together may operate as a user interface.

Serial input/output interface 420 accepts signals from the keypad 408 and transforms the signals into a form suitable for processing logic 414. The graphics controller 418 accepts information from the processing logic 414 and transforms it into a form suitable for the display 406. Similarly, wireless transceiver 404 receives signals from one or more cellular nodes via antenna 402 and transforms them into a form suitable for processing logic 414, and further accepts information from processing logic 414 and transforms it into a form suitable for transmission to one or more cellular nodes by wireless transceiver 404. The information sent and received by wireless transceiver 404 includes voice and other user data, command and control information used to configure and operate the wireless mobile communication device 400, and program instructions that can be executed by processing logic 414.

Processing logic 414 gathers information from other system elements, including input data from the serial input/output interface 420, wireless communication information from wireless transceiver 404, and program instructions and other data from memory 416 or from other systems (e.g., a server used to store and distribute copies of executable code) coupled to a wide area network and that communicate with wireless mobile communication device 400 via the wireless transceiver 404. Processing logic 414 executes the program instructions and processes the data accordingly. The program instructions may further configure processing logic 414 to send data to other system elements, such as information presented to the user via the graphics controller 418 and display 406, audio presented to the user via analog interface 422 and speaker 410, and wireless communication data transmitted via wireless transceiver 404 and antenna 402. Wireless transceiver 404 also enables processing logic 414 to communicate with other systems. Memory 416 may provide both volatile storage for low-latency temporary storage of information for processing logic 414, as well as non-volatile storage for long-term (but higher latency) storage of information.

Processing logic 414, and hence the wireless mobile communication device 400 as a whole, operates in accordance with one or more programs stored in memory 416 or received via wireless transceiver 404. Processing logic 414 may copy portions of the programs within memory 416 from non-volatile storage into volatile storage for faster access, and may switch between programs or carry out additional programs in response to user actuation of the keypad. The additional programs may be retrieved or received from other locations via wireless transceiver 404. One or more of these programs executes on processing subsystem 450, causing the subsystem to perform at least some of the functions of wireless mobile communication device 400 as disclosed herein.

In at least some illustrative embodiments, wireless mobile communication device 400 transmits and receives data via a plurality of cellular nodes such as those within base stations 200 and 250 of FIG. 1, each cellular node including a system configuration 300 as previously described. The data exchanged may be voice data, used by wireless mobile communication device 400 to provide a user of the device with voice communications with other users of similar wireless mobile communication devices, or may be other data, such as data originating from a server on the Internet and provided to the user via the display of the wireless mobile communication device 400. Regardless of the type of data, its origin, or its destination, the data is provided to and from wireless mobile communication device 400 via cellular nodes within base stations similar to base stations 200 and/or 250.

As wireless mobile communication device 400 is moved from one location to another, the device may reach the range limits of a cell (see FIG. 2), necessitating a handover of communications with the device from one cellular node to another. This cell-to-cell handover may be between cells under the control of a single base station with multiple cellular nodes, or cells under the control of cellular nodes within different base stations. Once a determination that a handover is needed has been made, the wireless mobile communication device attempts to secure a new communication link with the new or target cellular node before moving out of range of the current or source cellular node. Failure to establish communications with the target cellular node before communication with the source cellular node is lost can result in an interruption in an ongoing data exchange (e.g., a dropped telephone call). Such interruptions can result from the time delay or latency between determining the need for a handover and actually establishing a link between the wireless mobile device and the target cellular node.

Figure 5A:
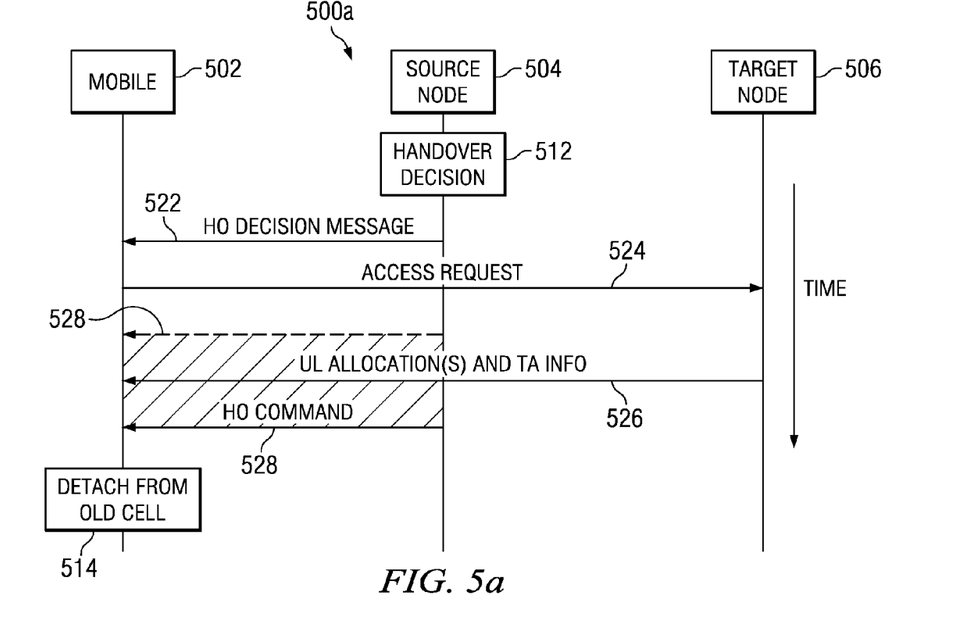
FIG. 5a shows a handover sequence between two cellular nodes and a mobile communication device triggered by a handover decision message from a cellular node, in accordance with at least some illustrative embodiments.
Figure 5B:
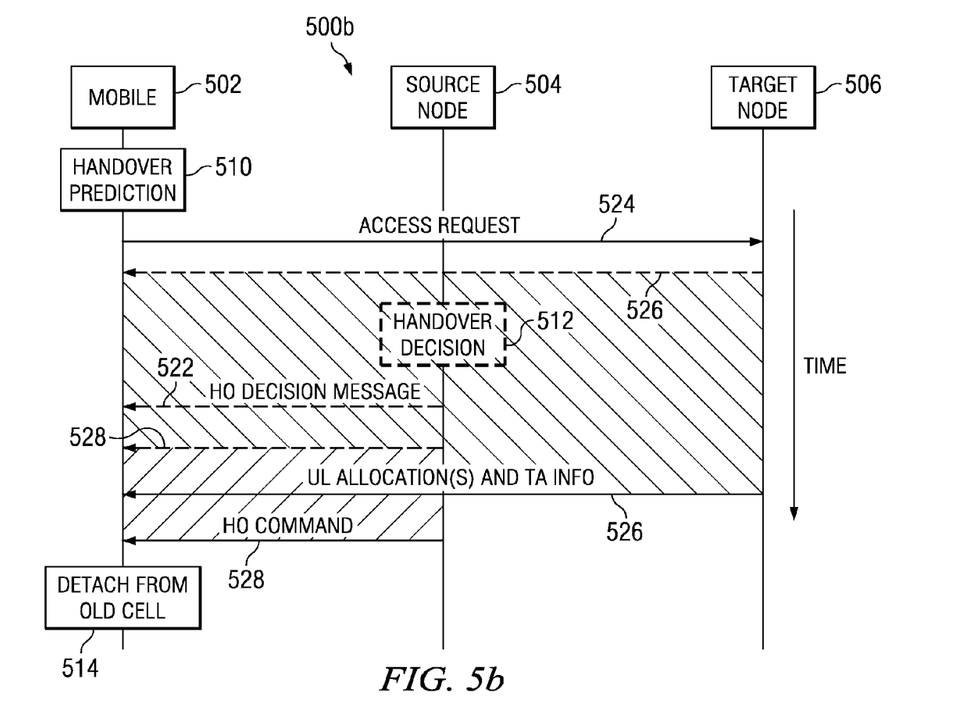
FIG. 5b shows a handover sequence between two cellular nodes and a mobile communication device triggered by a handover prediction by a mobile communication device, in accordance with at least some illustrative embodiments.

FIGS. 5a and 5b show two examples of handover sequences (500a and 500b) that reduce the above described latency, in accordance with at least some illustrative embodiments. Referring to FIG. 5a, communications between each of a wireless mobile communication device (Mobile) 502, source cellular node (Source Node) 504 and target cellular node (Target Node) 506 are indicated in the horizontal direction, and time is shown progressing from vertically from top to bottom. The handover sequence begins when handover decision 512 is made by logic within Source Node 504 (e.g., processing logic 330 of system configuration 300 of FIG. 3b). The decision can be made, for example, based upon diminishing signal strength of one cellular node and increasing signal strength of another cellular node, as reported by Mobile 502 to Source Node 504.

Continuing to refer to FIG. 5a, once the handover decision has been made, handover decision message (HO Decision Message) 522 is transmitted by Source Node 504 to Mobile 502. In at least some illustrative embodiments, handover decision message 522 is transmitted over an existing download communication resource between Source Node 504 and Mobile 502. For purposes of this discussion, a communication resource (herein after, "Resource") represents a portion of the overall channel capacity used for communication, to be used over one or more specific time intervals. Such Resource allocations may include, for example, a subdivision of a spectrum (e.g., a range of radio frequencies) used for transmitting and receiving information. Such Resource allocations may also include, for example, subdivisions in time and/or frequency, or distinct codes used concurrently across time and/or frequency (e.g., codes such as those used in Code Division Multiple Access communications). Further, data flows across a download Resource from a cellular node to Mobile 502, and across an upload Resource from Mobile 502 to a cellular node. After receiving handover decision message 522, Mobile 502 initiates a synchronization and upload Resource allocation request sequence. The synchronization process, as is known in the art, is a process by which a wireless mobile communication device, such as Mobile 502, adjusts its transmitted signal such that the data sequence is properly aligned with the receiver of the cellular node with which the Mobile is communicating via an upload Resource. The adjustment or "timing advance" is designed to compensate for the propagation delay of the signal transmitted by Mobile 502, which will vary depending upon the distance to the cellular node receiving the signal.

Mobile 502 request access to Target Node 506 by sending synchronization and upload Resource allocation request (Access Request) 524 to Target Node 506. In at least some illustrative embodiments, a random access channel (RACH) is used by Mobile 502 to send the request. As is known in the art, a random access channel is a general purpose upload Resource periodically made available by a cellular node for use by any wireless mobile communication device that requires it. Once Target Node 506 has processed the Access Request from Mobile 502 and allocated one or more upload Resources, Target Node 506 sends the upload Resource allocation(s) and timing advance information (UL Allocation and TA Info) 526 to Mobile 502. With the allocation of the upload Resource, Mobile 502 has one or more allocated resources with Target Node 506 which can be used to communicate with Target Node 506 once the handover command is issued. More than one resource can be allocated (e.g., 3 upload resources) and can be spread out over time such that at least one allocated resource is available late enough in time for use by Mobile 502 after receipt of a possibly delayed handover command. In at least some illustrative embodiments, the upload Resource allocation(s) and timing advance information is forwarded or relayed by Source Node 504 from Target Node 506 to Mobile 502 (not shown).

Sometime after the Access Request is initiated by Mobile 502, Source Node 504 sends handover command 528 to Mobile 502, and Mobile 502 detaches from Source Node 504 (block 514). The handover command may be issued by Source Node 504 anywhere within a time period spanning before and after the upload Resource allocation(s) and timing advance information is sent to Mobile 502, as shown by the two HO Command arrows 528 and the shaded area in between them. However because the process of establishing an upload path between Mobile 502 and Target Node 506 has already been started and possibly completed and does not depend upon receipt of the handover command, Mobile 502 may begin to communicate with Target Node 506 sooner when compared to systems that do not issue an Access Request until after receiving the handover command. Thus, by not waiting for the handover command to issue to establish an upload Resource between Mobile 502 and Target 506, the latency between the handover decision and the completion of the actual handover may be reduced.

The illustrative embodiment of 5b is similar to that of 5a, but instead of waiting for the handover decision message to be transmitted by Source Node 504 before initiating the synchronization and upload Resource allocation sequence, Mobile 502 instead sends the Access Request based upon an internally generated handover prediction (block 510, FIG. 5b). The prediction may be generated, for example, by an embodiment of Mobile 502 such as that of FIG. 4B, wherein software executing within processing subsystem 450 produces the prediction. Such a prediction can be generated, for example, based upon signal strength and interference measurements logged by Mobile 502.

Continuing to refer to FIG. 5b, once the handover prediction is made, Mobile 502 sending Access Request 524 to Target Node 506. The request is made before handover decision 512 is made and before handover decision message 522 is sent by Source Node 504 to Mobile 502. Both the decision 512 and the message 522 are shown in FIG. 5b with dashed lines, reflecting the fact that the decision and message are ignored by Mobile 502 as it relates to the handover sequence 500b. Target Node 506 responds to Access Request 524 by sending Mobile 502 upload Resource allocation(s) and timing advance information (UL Allocation and TA Info) 526 (either directly as shown in FIG. 5b, or indirectly via Source Node 504). The response may occur either before or after either handover decision 512 and handover decision message 522, as indicated by the two arrows 526 and the shaded area in between them. In at least some illustrative embodiments, the handover decision message 522 is not transmitted to Mobile 502 by Source Node 504. Continuing to refer to the illustrative embodiment of FIG. 5a, Source Node 504 issues handover command 528 to Mobile 502, and Mobile 502 then detaches from Source Node 504 (block 514). The handover command may be issued by Source Node 504 anywhere within a time period spanning before and after the upload Resource allocation(s) and timing advance information is sent to Mobile 502, as shown by the two HO Command arrows 528 and the shaded area in between them. In this manner the sequence of FIG. 5*b* can provide additional reductions in latency over the sequence of FIG. 5*a*, given that Access Request 524 is initiated without waiting for handover decision 512, thus providing even more time to setup the upload Resource with Target Node 506.

Figure 6A:
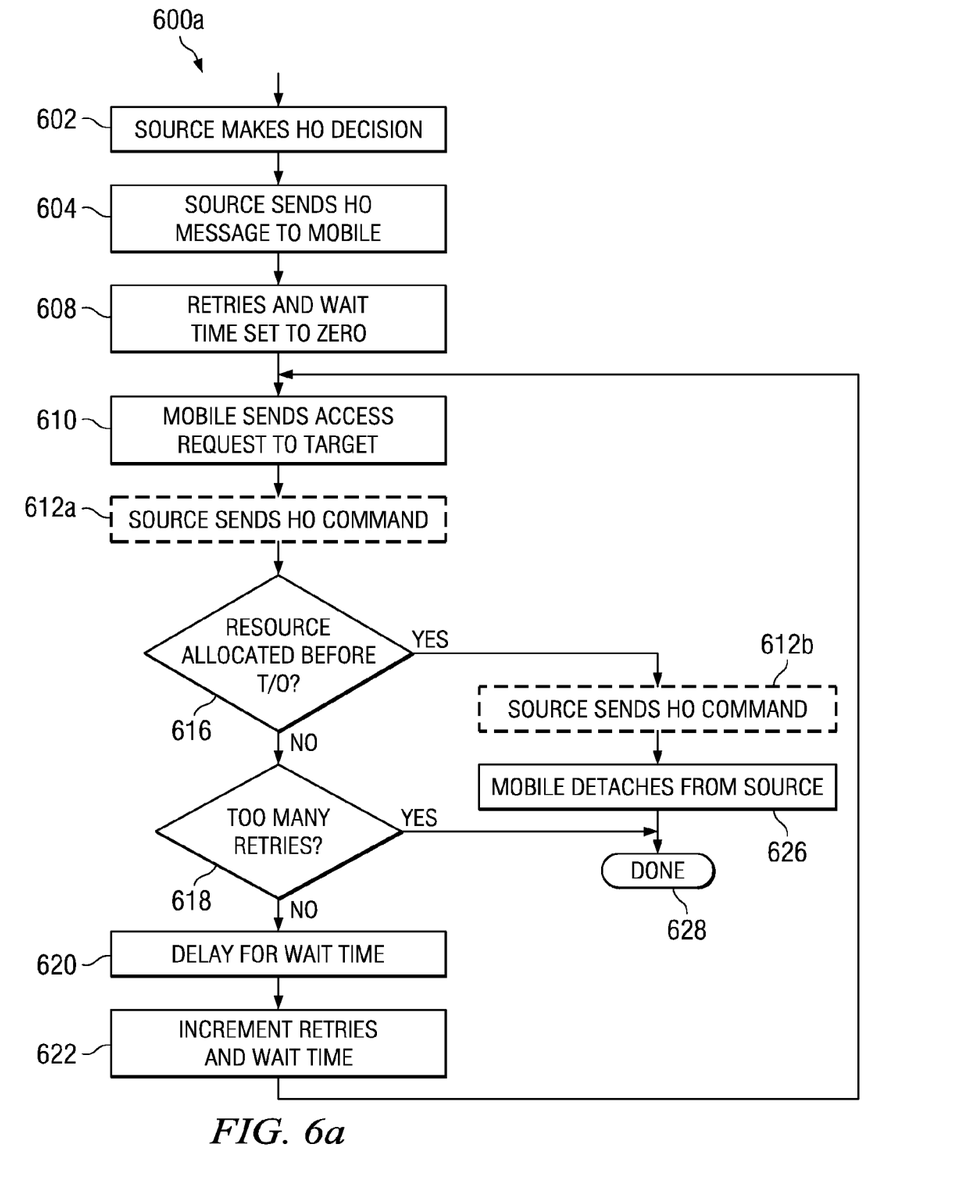
FIG. 6a shows a method for performing a reduced latency handover of a mobile communication device between two cellular nodes triggered by a handover decision message from a cellular node, in accordance with at least some illustrative embodiments.

FIG. 6*a* shows a method implementing the sequence of FIG. 5*a*, in accordance with at least some illustrative embodiments. Referring to both FIGS. 5*a* and 6*a*, the handover decision is made in block 602, and a handover decision message is sent by Source Node 504 to Mobile 502 (block 604). The retry counter and wait timer are then reset (block 608) and Mobile 502 sends an Access Request to Target Node 506 (block 610). In at least some illustrative embodiments, the Source Node 504 transmits the handover command (block 612*a*) before allocation of the requested upload Resource(s) is checked in block 616. If the upload Resource(s) is/are allocated and the timing advance information is provided (as indicated by UL Allocation and TA info 526 provided to Mobile 502 as shown in FIG. 5*a*) before a timeout occurs (block 616), Mobile 502 detaches from Source Node 504 (block 626) completing the method (block 628). In at least some illustrative embodiments, the Source Node 504 transmits the handover command (block 612*b*) after the requested upload Resource(s) is/are allocated, but before the Mobile detaches from the Source Node 504. The timeout referred to in block 616 is indicative of a failure to receive UL Allocation and TA info 526 of FIG. 5*a* within a predetermined maximum time limit. If the upload Resource allocation is not completed before the maximum time limit (a timeout), the upload Resource allocation request is repeated.

Continuing to refer to FIG. 6*a*, if the upload Resource allocation is not completed before a timeout (block 616) and too many attempts at requesting an upload resource allocation have been made (too many retries, block 618), the handover is aborted and the method ends (block 628). If the retry limit (e.g., 3 retries) has not been exceeded, the Access Request is again sent to Target Node 506 (block 610) after a wait delay (block 620). In at least some illustrative embodiments, the wait delay is initialized at zero or a constant value (block 608) and incremented after each attempt when the retry counter is incremented (block 622).

Figure 6B:
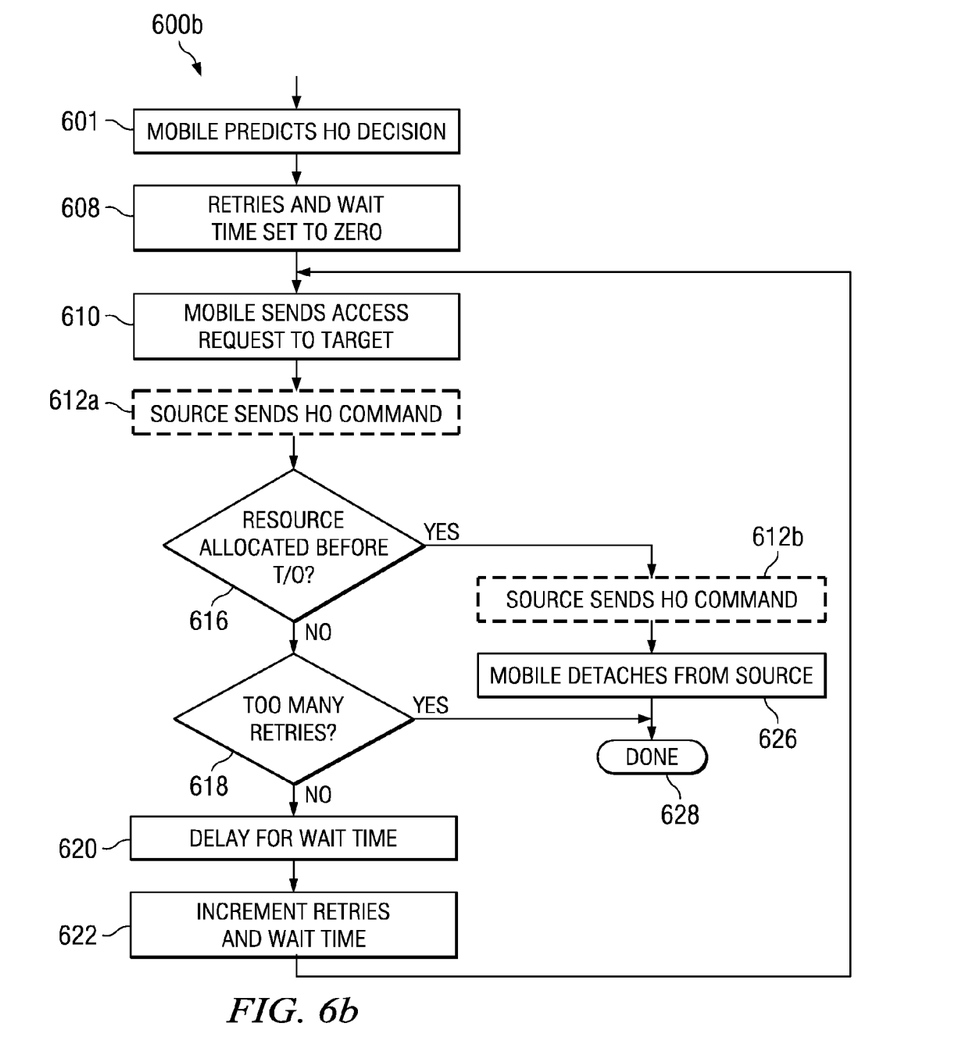
FIG. 6b shows a method for performing a reduced latency handover of a mobile communication device between two cellular nodes triggered by a handover prediction by a mobile communication device, in accordance with at least some illustrative embodiments.

FIG. 6*b* shows a method implementing the sequence of FIG. 5*b*, in accordance with at least some illustrative embodiments. Referring to both FIGS. 5*b* and 6*b*, the handover decision is predicted by Mobile 502 in block 601, and the retry counter and wait timer are reset (block 608). Mobile 502 sends an Access Request to Target Node 506 (block 610). In at least some illustrative embodiments, the Source Node 504 transmits the handover command (block 612*a*) before allocation of the requested Resource(s) is/are provided by Target Node 506 to Mobile 502. If the upload Resource(s) is/are allocated and the timing advance information is received (as indicated by UL Allocation and TA info 526 provided to Mobile 502 as shown in FIG. 5*b*) before a timeout occurs (block 616), Mobile 502 detaches from Source Node 504 (block 626) completing the method (block 628). In at least some illustrative embodiments, the Source Node 504 transmits the handover command (block 612*b*) after the requested upload Resource(s) is/are allocated, but before the Mobile detaches from the Source Node 504.

If receipt of the upload Resource allocation(s) and timing advance information is not completed before a timeout (block 616) and too many attempts at requesting an upload resource allocation have been made (too many retries, block 618), the handover is aborted and the method ends (block 628). If the retry limit (e.g., 3 retries) has not been exceeded, the Access Request is again sent to Target Node 506 (block 610) after a wait delay (block 620). In at least some illustrative embodiments, the wait delay is initialized at zero or a constant value (block 608) and incremented after each attempt when the retry counter is incremented (block 622).

The above disclosure is meant to be illustrative of the principles and various embodiments of the present invention. Numerous variations and modifications will become apparent to those skilled in the art once the above disclosure is fully appreciated. For example, although the embodiments described are illustrated within the context of a wireless radio frequency network using antennas, other embodiments using alternative wireless technologies (e.g., optical wireless technologies) are within the scope of the present disclosure. It is intended that the following claims be interpreted to embrace all such variations and modifications.

What is claimed is:

1. A wireless mobile communication device, comprising:
   a wireless transceiver comprising a transmitter configured to transmit a first signal synchronized for reception by a first cellular node; and
   processing logic that couples to the wireless transceiver, wherein before the wireless transceiver receives a handover command, the processing logic causes the transmitter to transmit a second signal for reception by a second cellular node to request allocation of an upload resource for communication with the second cellular node as part of an impending handover;
   wherein an allocated resource of a plurality of resources allocated to the wireless mobile communication device is associated with an earlier point in time and the handover command is received after the earlier point in time;
   wherein another allocated resource of the plurality of resources is associated with a later point in time and the handover command is further received before the later point in time; and
   wherein the wireless mobile communication device uses the allocated resource associated with the later point in time for data transmission.

2. The wireless mobile communication device of claim 1, wherein the processing logic further configures the transmitter to use the upload resource if a message comprising synchronization and resource allocation information is received by the wireless mobile communication device; and
   wherein after the handover command is received by the wireless transceiver the processing logic causes the transmitter to terminate use of the first signal for data transmission, and further causes the transmitter to transmit the second signal for data transmission using the upload resource.

3. The wireless mobile communication device of claim 1, wherein the processing logic causes the transmitter to transmit the second signal based upon receipt by the wireless mobile communication device of a message indicating that a handover command is about to be received by the wireless mobile communication device.

4. The wireless mobile communication device of claim 1, wherein the processing logic causes the transmitter to transmit the second signal based on a prediction by the processing logic that a handover command is about to be received by the wireless mobile communication device.

5. The wireless mobile communication device of claim 4, wherein the prediction by the processing logic is based upon measurements determined by the processing logic that characterize incoming signals received by the wireless mobile communications device.

6. The wireless mobile communication device of claim 1, wherein the request for allocation of the upload resource is transmitted using a random access channel; and
wherein the request for allocation of the upload resource comprises a request for synchronization information.

7. The wireless mobile communication device of claim 1, wherein the processing logic detects a timeout if resource allocation information is not received within a maximum time limit after the transmission of the second signal to request allocation of the upload resource.

8. The wireless mobile communication device of claim 7, wherein the processing logic causes the transmitter to repeat sending the second signal to request the allocation of the upload resource if the timeout is detected.

9. The wireless mobile communication device of claim 1, wherein the processing logic causes the transmitter to repeat sending the second signal to request the allocation of the upload resource if a prior request is unsuccessful; and
wherein successive attempts to secure the allocation of the upload resource are separated by an inter-attempt time interval.

10. The wireless mobile communication device of claim 9, wherein the inter-attempt time interval is increased after each successive attempt to secure the allocation of the upload resource.

11. The wireless mobile communication device of claim 9, wherein the transmitter is concurrently configured to transmit either the first signal or the second signal.

12. A plurality of cellular nodes, each comprising:
a wireless transceiver comprising a transmitter and a receiver, and configured to transmit signals to, and receive signals from, a wireless mobile communication device; and
processing logic that couples to the wireless transceiver;
wherein before the processing logic of a first cellular node of the plurality of cellular nodes causes its transmitter to transmit a handover command, the receiver of a second cellular node of the plurality of cellular nodes receives a request to allocate an upload resource as part of an impending handover;
wherein an allocated upload resource of a plurality of resources allocated to the wireless mobile communication device is associated with an earlier point in time and the handover command is transmitted after the earlier point in time;
wherein another allocated upload resource of the plurality of resources is associated with a later point in time and the handover command is further transmitted before the later point in time; and
wherein the wireless transceiver is configured to use the allocated upload resource associated with the later point in time for data transmission.

13. The plurality of cellular nodes of claim 12, wherein the processing logic of the first cellular node causes its transmitter to transmit a handover decision notification message before the first cellular node sends the handover command, and before the second cellular node receives the request to allocate the upload resource.

14. The plurality of cellular nodes of claim 12, wherein the request to allocate the upload resource is received on a random access channel; and
wherein the request for allocation of the upload resource comprises a request for synchronization information.

15. The plurality of cellular nodes of claim 12, wherein the processing logic of the second cellular node causes its transmitter to transmit a message comprising synchronization and allocation information before the handover command is transmitted by the first cellular node.

16. The plurality of cellular nodes of claim 12, wherein the processing logic of the second cellular node causes its transmitter to transmit a message comprising synchronization and allocation information after the handover command is transmitted by the first cellular node.

17. A method, comprising:
receiving, by a target cellular node within a wireless communication system, a request to allocate an upload resource as part of an impending handover;
transmitting, by the target cellular node in response to the request to allocate the upload resource, a message comprising synchronization and resource allocation information;
transmitting, by a source cellular node, a handover command after the receiving by the target cellular node the request to allocate the upload resource;
transmitting, by the source cellular node, the handover command after an earlier point in time, an allocated resource of a plurality of resources allocated to the wireless mobile device being associated with the earlier point in time;
transmitting, by the source cellular node, the handover command before a later point in time, another allocated resource of the plurality of resources being associated with the later point in time; and
using, by the wireless mobile device, the allocated resource associated with the later point in time to communicate with the target cellular node.

18. The method of claim 17, further comprising:
transmitting, by a wireless mobile device to the target cellular node, the request to allocate the upload resource before the transmitting of the handover command; and
receiving, by the wireless mobile device, the message comprising the synchronization and resource allocation information after transmitting the request to allocate the upload resource.

19. The method of claim 18, further comprising:
receiving, by the wireless mobile device, the handover command after transmitting the request to allocate the upload resource; and
ending, by the wireless mobile device, communications with the source cellular node and continuing to communicate with a target cellular node in response to receiving the handover command.

20. The method of claim 18, further comprising:
transmitting, by the source cellular node to the wireless mobile device, a handover decision message notifying the wireless mobile device that a handover command will be transmitted by the source cellular node to the wireless mobile device; and
transmitting, by the wireless mobile device to the target cellular node, the request to allocate the upload resource in response to receiving the handover decision message.

21. The method of claim 18, further comprising:
predicting, by the wireless mobile device, that the handover command will be transmitted by the source cellular node; and
transmitting, by the wireless mobile device to the target cellular node, the request to allocate the upload resource in response to the predicting that the handover command will be transmitted.

22. The method of claim 18, further comprising:
repeating the request to allocate the upload resource if the message comprising the synchronization and resource allocation information is not received within a maximum time interval after the transmitting to the target cellular node of the request to allocate the upload resource.

23. The method of claim 18, further comprising:
retransmitting the request to allocate the upload resource if a prior request is unsuccessful; and
separating successive retransmitting attempts by a time interval that increases with each successive attempt.

24. The method of claim 18, wherein the transmitting to the target cellular node of the request to allocate the upload resource comprises using a random access channel and further comprises transmitting a request for synchronization information as part of the request to allocate the upload request.

* * * * *